United States Patent
Ghosh et al.

(10) Patent No.: US 10,078,723 B1
(45) Date of Patent: Sep. 18, 2018

(54) METHOD AND APPARATUS FOR DESIGN RULES DRIVEN INTERACTIVE VIOLATION DISPLAY

(71) Applicant: Cadence Design Systems, Inc., San Jose, CA (US)

(72) Inventors: Sanjib Ghosh, Greater Noida (IN); Preeti Kapoor, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/282,892

(22) Filed: Sep. 30, 2016

(51) Int. Cl.
 *G06F 17/50* (2006.01)

(52) U.S. Cl.
 CPC ...... *G06F 17/5081* (2013.01); *G06F 17/5004* (2013.01); *G06F 17/5009* (2013.01); *G06F 2217/02* (2013.01); *G06F 2217/04* (2013.01); *G06F 2217/06* (2013.01)

(58) Field of Classification Search
 CPC ............ G06F 17/5081; G06F 17/5004; G06F 17/5009; G06F 2217/06; G06F 2217/02; G06F 2217/04
 USPC .......................................................... 703/15
 See application file for complete search history.

(56) References Cited

U.S. PATENT DOCUMENTS

| | | | | |
|---|---|---|---|---|
| 5,247,455 A * | 9/1993 | Yoshikawa | ......... | G06F 17/5081 716/112 |
| 5,889,677 A * | 3/1999 | Yasuda | ............... | G06F 17/5022 716/113 |
| 5,907,698 A * | 5/1999 | Kucukcakar | ......... | G06F 17/5045 716/104 |
| 5,933,358 A * | 8/1999 | Koh | .................... | G06F 17/5022 703/14 |
| 6,330,705 B1 * | 12/2001 | Matsushita | ......... | G06F 17/5068 716/112 |
| 6,341,366 B1 * | 1/2002 | Wang | .................. | G06F 17/5081 716/112 |
| 6,606,735 B1 * | 8/2003 | Richardson | ......... | G06F 17/5081 716/112 |
| 6,978,437 B1 * | 12/2005 | Rittman | .................... | G03F 1/36 250/492.3 |

(Continued)

FOREIGN PATENT DOCUMENTS

| JP | 07105251 A | * 4/1995 |
|---|---|---|
| JP | 08263543 A | * 10/1996 |
| JP | 2010198445 A | * 9/2010 |

*Primary Examiner* — Phallaka Kik
(74) *Attorney, Agent, or Firm* — Vista IP Law Group, LLP

(57) ABSTRACT

An approach is described for implementing a GUI that provides a user interface for reviewing and correcting design rule violations within a CAD program. According to some embodiments, a user may enter a serial review process which may utilize contextual information to determine where to start that review process. Further, the serial review process may enable the user to review rule violations in an individual manner for a respective object. Furthermore, a dynamic directional violation identifier may be used to identify additional errors in the direction of movement, such as by processing a set of rules and parameters with respect to objects in the direction of movement. The serial review process and the dynamic directional violation identification may be combined in a single process such that as violations are reviewed, and corrections are attempted, they may be verified to determine if they generate additional violations.

20 Claims, 21 Drawing Sheets

(56) References Cited

U.S. PATENT DOCUMENTS

| | | | | |
|---|---|---|---|---|
| 7,281,232 B1* | 10/2007 | Nicolino, Jr. | G06F 17/5081 | 716/112 |
| 7,971,174 B1 | 6/2011 | Khalsa | | |
| 8,239,797 B1 | 8/2012 | Ghosh | | |
| 8,347,274 B2* | 1/2013 | Tanabe | G06F 11/362 | 717/135 |
| 8,539,421 B2* | 9/2013 | Agarwal | G06F 17/5081 | 716/112 |
| 8,555,237 B1* | 10/2013 | Juneja | G06F 17/5081 | 716/111 |
| 8,661,371 B1* | 2/2014 | Wang | G06F 17/5068 | 716/52 |
| 8,694,943 B1* | 4/2014 | Yu | G06F 17/5081 | 716/123 |
| 9,026,958 B1 | 5/2015 | Ghosh | | |
| 9,064,063 B1 | 6/2015 | Yu | | |
| 9,740,814 B1 | 8/2017 | Ghosh | | |
| 2002/0112214 A1* | 8/2002 | Keller | G06F 17/5022 | 716/112 |
| 2002/0166103 A1* | 11/2002 | Rittman | G06F 17/5081 | 716/52 |
| 2004/0250222 A1* | 12/2004 | Saito | G06F 17/5022 | 716/115 |
| 2005/0022151 A1* | 1/2005 | Rittman | G06F 17/5081 | 257/734 |
| 2005/0193360 A1* | 9/2005 | Otsubo | G06F 17/5045 | 716/101 |
| 2005/0197817 A1* | 9/2005 | Iwaki | G06F 17/5036 | 703/14 |
| 2005/0268258 A1* | 12/2005 | Decker | G06F 17/5022 | 716/104 |
| 2006/0190885 A1* | 8/2006 | Ohkubo | G06F 17/5031 | 716/113 |
| 2006/0206844 A1* | 9/2006 | Katou | G06F 17/5036 | 716/112 |
| 2007/0124709 A1* | 5/2007 | Li | G06F 17/5081 | 716/112 |
| 2008/0005713 A1* | 1/2008 | Singh | G06F 17/5045 | 716/102 |
| 2008/0086709 A1* | 4/2008 | Rittman | G06F 17/5081 | 716/52 |
| 2008/0313584 A1* | 12/2008 | Otsuka | G06F 17/5022 | 716/106 |
| 2009/0193383 A1* | 7/2009 | Christo | G06F 17/5077 | 716/129 |
| 2009/0265672 A1* | 10/2009 | St.John | G06F 17/5063 | 716/106 |
| 2011/0107282 A1* | 5/2011 | Sheng | G06F 17/5068 | 716/106 |
| 2011/0138345 A1* | 6/2011 | Bakshi | G06F 17/505 | 716/106 |
| 2011/0185315 A1* | 7/2011 | Armour | G06F 8/34 | 715/853 |
| 2011/0225561 A1* | 9/2011 | Orita | G06F 17/5077 | 716/131 |
| 2013/0074024 A1* | 3/2013 | Chase | G06F 17/5081 | 716/112 |
| 2013/0326445 A1* | 12/2013 | Brink | G06F 17/5081 | 716/112 |
| 2014/0137069 A1* | 5/2014 | Duff | H03H 11/1221 | 716/132 |
| 2014/0142916 A1* | 5/2014 | Shen | G06F 17/5068 | 703/14 |
| 2014/0258954 A1* | 9/2014 | De | G06F 17/504 | 716/113 |
| 2015/0052490 A1* | 2/2015 | Cilingir | G03F 1/36 | 716/52 |
| 2016/0171148 A1* | 6/2016 | Helms | G06F 17/5045 | 716/102 |

* cited by examiner

METHOD AND APPARATUS FOR DESIGN RULES DRIVEN INTERACTIVE VIOLATION DISPLAY

BACKGROUND

An embodiment of the invention is directed to an improved approach for performing design rules driven (DRD) interactive violation display. There are many types of computing applications that utilize graphical user interfaces (GUIs) to enable users to visually edit and modify the configuration of objects on a screen. For example, many types of drawing and computer aided design (CAD) tools are implemented using GUI-style interfaces. The GUI interface permits the user to visually manipulate the configuration of objects that are being drawn and displayed on the screen of a display device. In many of these GUIs, the user may select an object and can manipulate or edit the object using a pointing device such as a mouse pointer. For operations that involve moving an object, the GUI allows the user to manipulate an object by dragging and dropping the object from a first location to a second location.

These CAD tools are often used in the context of designing systems, chips, or other logical representations of items to be created under certain rules or conditions. Such as enforcement of spacing requirements between objects, enforcement of overlap or contact between objects, and other rules relevant to positioning between objects and a substrate or other support structure. An electronic design automation (EDA) system for implementing an electronic design are one such type of CAD tool. Such systems typically include a graphical user interface that allows a designer to manipulate electronic components and design elements for an electronic system/component/module.

EDA tools are often used for performing design rule compliance, verification, and/or correction. These EDA tools provide processes whereby design rules may be reviewed using a graphical user interface (GUI).

However, as the complexity of the elements to be designed and the number of rules relevant to different objects has increased, the graphical user interfaces of these CAD tools, utilized by design and test engineers, have become so cluttered with reported rule violations that it can be very difficult to identify any particular rule violation of the many rule violations reported, and as such the design and test engineers face increased difficulty in performing the appropriate verification.

Therefore, there is a need for an improved approach for performing design rules driven (DRD) interactive violation display. The improved approach should provide a user a way to review rule violations in a more manageable way.

SUMMARY

Some embodiments of the present invention provide an improved approach for implementing a GUI that provides a user interface for reviewing and correcting design rule violations within a CAD program.

According to some embodiments, a user may enter a serial review process which may utilize contextual information to determine where to start that review process. Further, the serial review process may enable the user to review rule violations in an individual manner, such as via cycling through violations in a counter clockwise manner for a respective object. Furthermore, a dynamic directional violation identifier may be used to identify additional errors in the direction of movement, such as by processing a set of rules and parameters with respect to objects in the direction of movement. The serial review process and the dynamic directional violation identification may be combined in a single process such that as violations are reviewed, and corrections are attempted, they may be verified to determine if they generate additional violations. This approach provides an improved visual representation that corresponds in the field of processing and displaying violations in CAD programs.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

DETAILED DESCRIPTION

Figure 1:
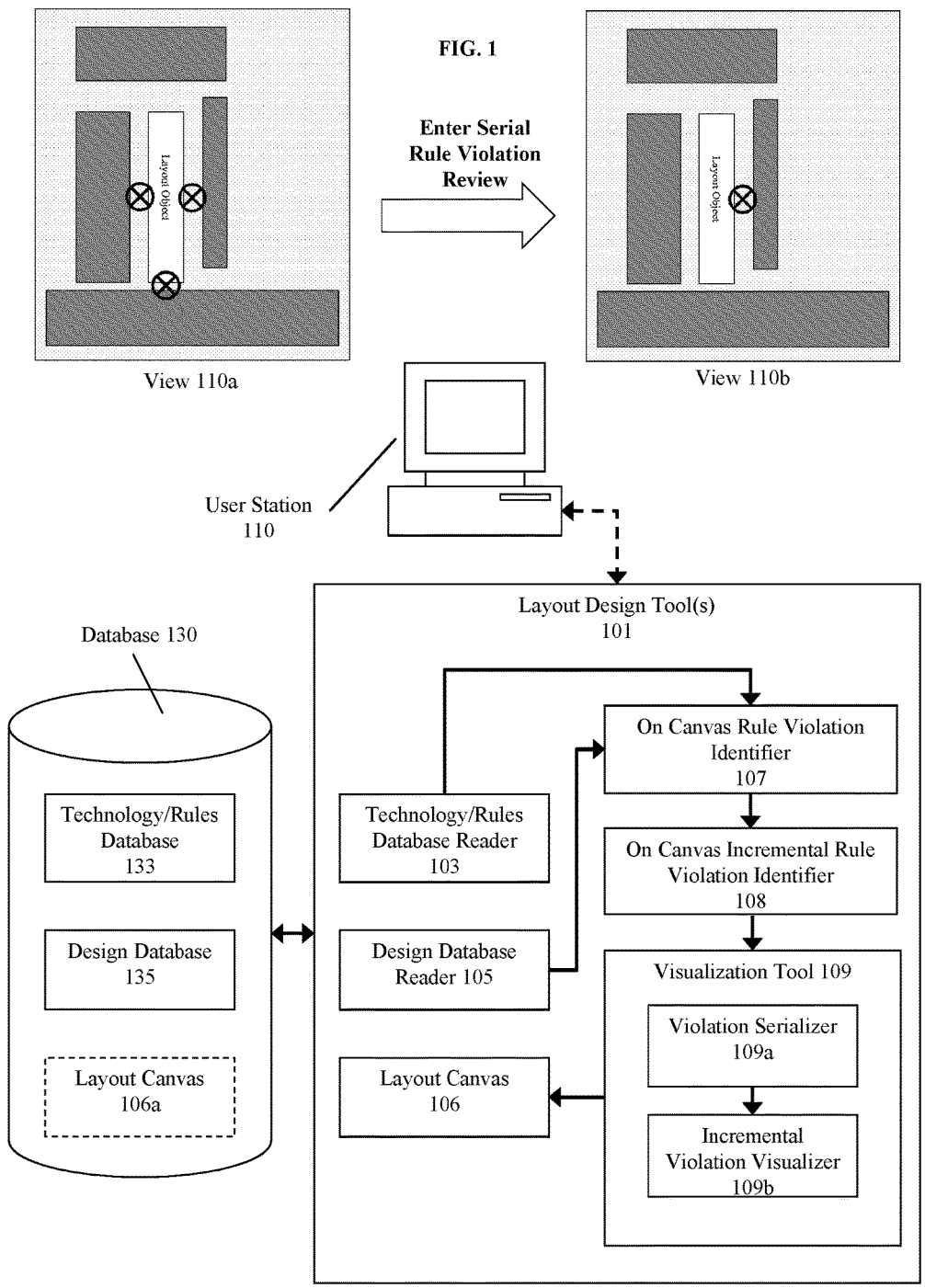
FIG. 1 depicts an example system for performing design rule driven interactive violation display.

Embodiments of the present invention provide a system, method, and product for implementing an improved user interface. According to some embodiments, a user may enter a serial review process which may utilize contextual information to determine where to start the review process. Further, the serial review process may enable the user to review rule violations in an individual manner, such as via cycling through violations in a counter clockwise manner for a respective object. The review process may comprise cycling through violations with respect to individual objects by position, such as in a clockwise order starting at a specific point on the dial like 12 o'clock. The review process may also comprise cycling through violations by type, such as spacing requirements, then minimum overlap requirements, or any other requirement type or category. In some embodiments the process may comprise some combination of position based ordering and type based ordering, wherein a complete cycle may be performed for an individual type or category of violations before going through other types of categories of information. For instance, the process may cycle through errors, before cycling though warnings.

Furthermore, a dynamic directional violation identifier may be used to identify additional errors in the direction of movement of an object, such as by processing a set of rules and parameters with respect to objects in the direction of movement. This may be performed by comparing a current location with an original location before the movement began, computation of a vector, and then analysis of objects in proximity to the object being moved to determine objects that may potentially be in the path of the object being moved. Once these objects are identified, the new position of the object and the proximate objects can be used as a set of inputs to be processed with respect to the set of rules to identify any errors created by said movement. Finally, any identified errors created as a result of the movement, or in the direction of the movement can be displayed to the user. In this way the user can be quickly informed of the additional errors created as a result of the movement without requiring that the user wait for the entire layout to be processed or the extra resources required for such processing in comparison to the dynamic directional approach.

The serial review process and the dynamic directional violation identification may be used as a combined process such that as violations are reviewed and corrections are attempted, the corrections attempts may be verified to determine if they generate additional violations. This approach provides an improved visual representation that corresponds to the field of processing and displaying violations in CAD programs. Furthermore, the process could be executed in a seamless manner, where the movement of an object triggers the entry into the dynamic directional violation mode and the display of errors that are either newly created as a result of the movement or only in the direction of the movement, or some combination thereof.

Finally, both processes, whether alone or in combination, may be combined with different visual cues. For example, different violations may be displayed in a different manner depending on whether they are new, of a particular type, group, or category. Display manners may include differing symbols, colors, sizes, locations, or graphical effects such as glowing, shadows, blinking, flashing, etc. Furthermore, the objects themselves may be modified using different visual cues as well to indicate summary information, such as if the object is select, has been moved, has remaining errors or warnings, and the like.

FIG. 1 depicts an example system for performing design rule driven interactive violation display. The system can access data corresponding to one or more databases for managing a layout canvas and for maintaining design and technology/rules data that can be processed and used to serially review design rule violations for layout objects. For instance, the system can be used to identify some rule violations, and then be used to serially review those violations. In this way, a user does not have to attempt to identify multiple violation indicators that may be visually placed in an overlapping manner over other indicators that indicate design rules violations.

The system includes a database 103, which is illustrated as including a technology/rules database 133, a design database 135, and possibly a layout canvas dataset 106*a*. The database 130 could be a single database with one or more subsets within that database for the technology/rules database 133, a design database 135, and possibly a layout canvas dataset 106*a*, as illustrated in the figure. However, in other embodiments the database could comprise multiple separate databases on different computing systems and/or in different locations.

The technology/rules database 133, generally includes at least the necessary technology information and rules associated with that technology information to identify one or more rule violations. For instance, the technology information may include a series of parameters describing minimum widths, such as gate and trace widths, and other process parameters. The associated rules may include various spacing parameters, such as minimum spacing between gates, traces, power plains/rails etc. (herein: technology objects) and minimum overlap for vias or other circuit/routing elements. Furthermore, while the above is discussed in the context of circuit layout of individual elements (gates and traces) this information could be provided for use in other processes not limited to circuit layout.

The design database 135, generally includes information related to aggregated sets of smaller technological elements and rules associated with those aggregated sets (herein: design objects). By way of example, while the technology is discussed in the context of circuit layout of individual elements (gates and traces) this information could be provided on a block level to enforce other requirements for a collection of elements, aka higher lever representations of a plurality of smaller elements collected or organized into a particular design. In some embodiments, the elements may include other elements not constructed of out of individual elements found in the technology database, such as boundaries, spacers, substrate regions, etc., which may be associated with either or both an individual set of rules and parameters and a default set of rules and parameters.

The layout canvas 106*a*, provides storage for a dataset associated with a particular CAD design. For instance, the layout canvas may be populated with a series of technology objects and/or a series of design objects, such that the layout itself represents a collection of elements in a specific configuration. Furthermore, the layout canvas may also be associated with a collection of data regarding some or all of the objects in the layout. In one configuration, the layout may comprise a specific configuration of design elements laid out on one or more virtual layers and associated with one or more sets of positioning/orientation information to identify location. Further, individual layout objects might include or be associated with an object identifier such that the layout objects can be associated with data representing individual rule violations or lack thereof. In some embodiments, a particular layout canvas or portion thereof may be converted into a design object for use in other layouts. In some embodiments, design objects may be accessible as a particular layout of a layout object, such that the hierarchy of technology objects, design objects, may be maintained, but that the design objects and layout objects can be entered, edited, viewed or otherwise accessed as need in manner most appropriate to an individual user action.

Layout canvas 106*a* may be provided, as illustrated, as optional additional storage for a particular layout. However, the layout canvas may be provided in some embodiments solely as layout canvas 106 in a storage apparatus associated with user station 110 or on the user station itself. Furthermore, layout canvas 106*a* may include a particular layout of a set of layouts stored together, and an individual layout or portion thereof may be loaded into layout canvas 106.

User station 110 may include or provide access to layout design tool(s) 101. The user station 110 may be for performing deign entry and review of an electronic design according to some embodiments of the invention. The user station 110 may comprise any type of computing station that may be used to operate or interface with the database 130. Examples of such user stations include workstations, personal computers, or remote computing terminals. The user station 110 comprises a display device, such as a display monitor, for displaying a user interface to users at the user station. The user station 110 also comprises one or more input devices for the user to provide operational control over the user station, such as a mouse or keyboard to manipulate a pointing object in a graphical user interface.

View 110*a* and view 110*b* provide a simplified illustration of one aspect of the invention which may be view at a user station and may facilitated review and possibly correction of one or more design rules violations. First, view 110*a* represents an initial view of portion of a layout area that includes a set of objects (represented here by five rectangles within a layout area). The first view 110*a* further includes an illustration of three spacing violations (visually represented as X's with circles around them), though designs often include far more violation indicators and violation indicators of other types. View 110*b* provides and illustrative view of the process after serial rule violation mode has been entered, where of the three rules only one is shown at any given time, and where violations may be cycled through in a manageable way. A more detailed discussion of the serial review process is provided below including an illustration similar to the views included herein.

The layout design tool(s) 101 may include various components or modules either physical modules, logical modules stored in memory for execution by a processor, or some combination thereof, such as the ones illustrated herein (see FIG. 1 items 103, 105, 106, 107, 108, and 109) in order to provide the underlying processes necessary for performing the various aspects as disclosed herein. For instance, the layout design tool(s) 101 may include database access modules for interpreting data collected for database 130 and for managing and/or accessing layout data either locally, remotely, or some combination thereof. Furthermore, the layout design tool(s) 101, for manipulating one or more objects and to address one or more rule violations, may include an on canvas rule violation identifier 107 and a violation serializer 109*a* within an incremental violation tool 109 for displaying and reviewing rule violations. Finally, the layout design tool(s) 101 may include an on canvas incremental rule violation identifier 108 and an incremental violation visualizer 109*b* within the visualization tool 109 for identifying rule violations created as a result of subsequent movement of an object.

Technology/Rules database reader 103 provides access and any necessary translation or interpretation of information received from the technology/rules database 133. For example, the technology/rules database reader 103 may request and or receive data corresponding to one or more objects stored in a layout canvas, either by sending a request directly to the database, or via one or more intermediaries. In another example, the technology/rules database reader 103 may determine that a particular layout in the layout canvas is associated with a particular process technology such as the semiconductor manufacture process provided by TSMC at 16 nm. As a result, the technology/rules database reader 103 may request the associated technology parameter rules from the technology/rules database 133. These retrieved rules may then be translated as necessary to provide them to the on canvas rule violation identifier 107.

Design database reader 105 also provides access and any necessary translation or interpretation of information received but does so with regard to the design database 135. The design database reader 105 may request and or receive data corresponding to one or more design objects stored in a layout canvas, either by sending a request directly to the database, or via one or more intermediaries. For instance, the design database reader 103 may determine that a particular design object of a layout in the layout canvas is associated with a particular set of rules such as a minimum spacing with regard to all objects, and a special spacing with regard to certain types of objects. As a result, the design database reader 105 may request the associated technology parameter rules from the design database 135. These retrieved rules may then be translated as necessary to provide them to the on canvas rule violation identifier 107.

With regard to the layout canvas 106, the discussion above pertaining to 106*a* applies to layout canvas 106. However, in some embodiments certain data, such as temporary data regarding edits not yet committed to the layout may only be stored locally at the user station 110.

The on canvas rule violation identifier 107, receives a set of rules and relevant parameters from the technology/rules database reader 103, and a set of design objects from the design database reader 106. The on canvas rule violation identifier 107 may then identify the various object within the layout, stored on the layout canvas, and execute one or more processes to determine which rules are being violated.

In addition, in some embodiments an on canvas incremental rule violation identifier 108 may be provided to identify any rule violations created as a result of an incremental action, such as a user manipulating the location of an object. Such processes are largely similar to those for the on canvas rule violation identifier, but are executed with respect to a given object and any objects in the direction of the change. In this way the on canvas incremental rule violation identifier 108 may be used to identify any rule violations created as a result of the incremental action, without necessitating the need to process the entire layout canvas using the on canvas rule violation identifier 107.

The visualization tool 109 provides the necessary processing for display of the various objects on the layout canvas. For instance, the visualization tool 109 may be used to display a user interface for a particular piece of CAD software, such that a user is enabled to view, manipulate, and review a particular arrangement of layout objects, and to execute evaluation of that arrangement of layout objects against a set of rules. Furthermore, the visualization tool 109 may also include both a violation serializer 109*a* and an incremental violation visualizer 109*b*.

The violation serializer 109*a* provides the interface portion of the disclosed process for reviewing violations in a layout stored in a layout canvas. For example, the on canvas rule violation identifier 107 may execute a series of rules against the layout, and generate records pertaining to rule violations associated with one or more objects within the layout. However, the violation serializer 109*a* is provided in order to review the actual violations by displaying the collection of violations in an organized manner. For instance, the violation serializer 109*a* may take the rule violation records and display them in an orderly manner by displaying individual violations in a clockwise or counter clockwise order with respect to a particular object. That object may be selected based on the context of the display view, such as the most central object on a particular display. In some embodiments the context might include the location of a pointer displayed on a screen, or any other relevant contextual information, such as most recently viewed, selected, search for, or edited object. In some embodiments the violations may be review in other orders, such as by type, by element with the most or least violations, or some combination thereof. An object based example is illustrated below in FIGS. 6A-E.

The incremental violation visualizer 109b provides the interface elements for indicating violations identified in the direction of movement of a particular object. In particular, in the event of movement of an object, the incremental violation visualizer will display violations identified in the direction of movement of the object as determined by the on canvas incremental rule violation identifier 108. In this way, an individual user who moves an object into a location that causes additional errors will be informed of the error created by that movement. An example illustration is provided in FIGS. 7A-G.

Figure 2:
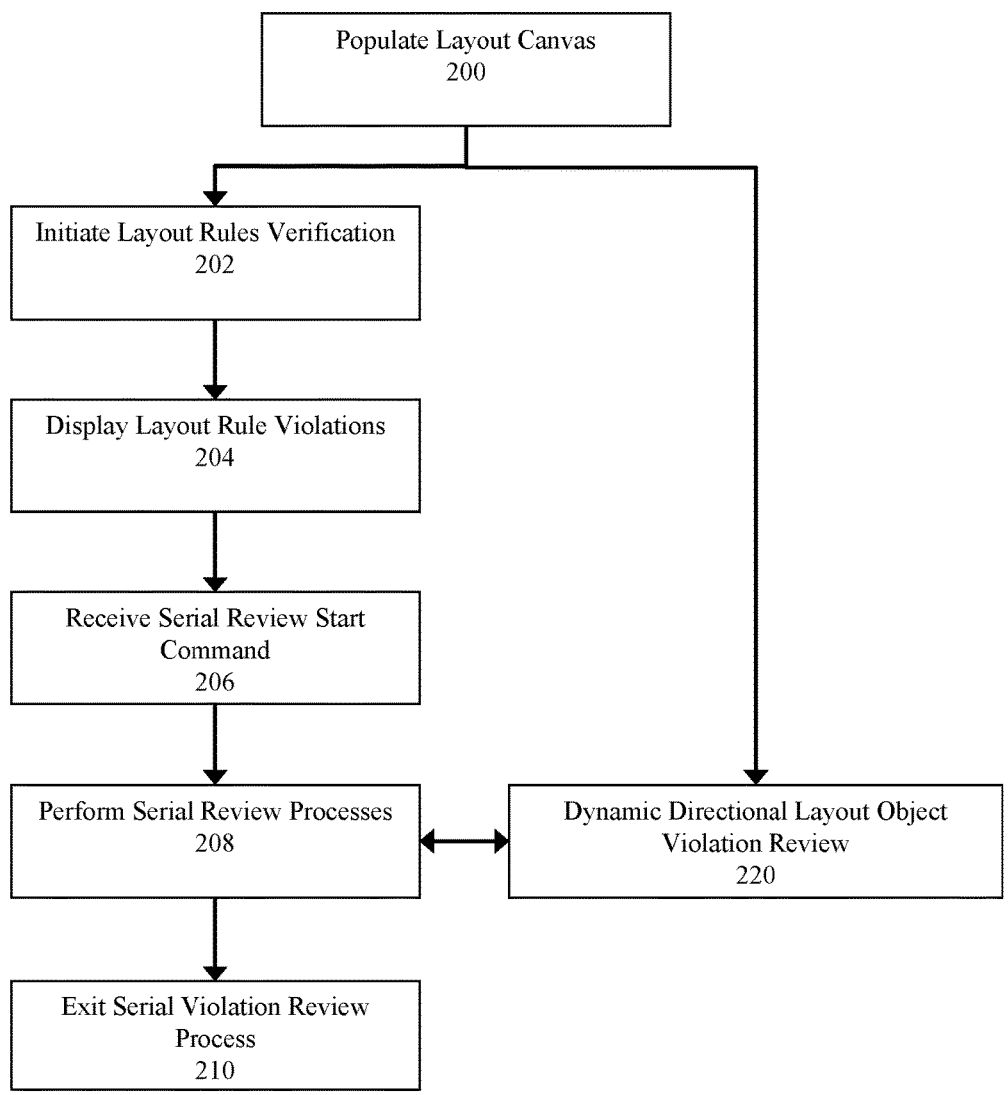
FIG. 2 illustrates a flow of an approach for implementing design rule driven interactive violation display.

FIG. 2 illustrates a flow of an approach for implementing design rule driven interactive violation display. This approach includes population of a layout canvas, rules verification, entering the disclosed serial review processes, and dynamic direction layout object violation review, either in the context of the serial review process or on its own.

At 200, the layout canvas is populated. This can be accomplished in various ways. For instance, a file may be loaded that comprises a previously created layout, or a layout me be created from scratch using various elements from the previously discussed technology/rules database 133 and/or design database. Furthermore, a design database object comprising a collection of other design database objects and/or technology objects may be created.

After the layout canvas 106 is populated with a particular layout a user may initiate or cause to be initiated a layout rule verification at 202. As a result, the on canvas rule violation identifier may process the layout with respect to the information received from technology/rules database 133, the design database 135 via technology/rules database reader 103, design database reader 105, and generate one or more records corresponding to rule violations associated with the objects in the layout.

Subsequently, the process will trigger the display of layout rule violations at 204 to display the violations to a user. Generally, and as illustrated here, the process will then display the violations using various color coded indicators to indicate to the user where those layout violations are. However, as discussed previously, these indicators are often numerous and overlapping making it hard to identify any particular violation from the other violations.

At 206, a user may perform an action to enter the serial review process, such as via a keystroke, mouse click, menu selection, or any combination thereof. Wherein, the action causes a serial review start command to be executed, and contextual information is provided as discussed above in order to determine a starting location for review. However, in some embodiment the starting location may be determined as modified, or determined, by default preferences or parameters associated with the user, user station, or the layout itself or some combination thereof.

The serial review processes proceeds at 208, where, as discussed above and illustrated below, the serial review process provides a method by which individual violations of the identified violations may be review separately in an ordered fashion.

In some embodiments, dynamic directional layout violation review may be performed at 220. Where, during review of individual violations any changes in the position of an object results in the incremental review using the on canvas incremental rule violation identifier 108 and the incremental violation visualizer 109b to determine and display at least any newly created rule violations. For instance, if in response to a violation as a result of a particular object being too close to another object the object is moved, incremental review will cause any additional violations created in the direction of the movement to be displayed. In this way, a designer will receive immediate notification of additional violations created by the movement. Additionally, the user may also return to the previous configuration/point with respect to the serial review process. Furthermore, in some embodiment the dynamic directional layout violation review may be performed outside of the context of the serial review process, where movement of an object results in only display of any newly created violations in the direction of movement or both the newly created violations and any preexisting violations in the direction of movement. An example illustration is provided in FIGS. 7A-G.

Finally, at 210 the serial violation review process may be exited, such as by similar means to those used to enter the serial violation review process or other appropriate triggering mechanism, such a correction of all rule violations, prompting to indicate that the user is at the end of a list of violations, or any other appropriate criteria.

Figure 3A:
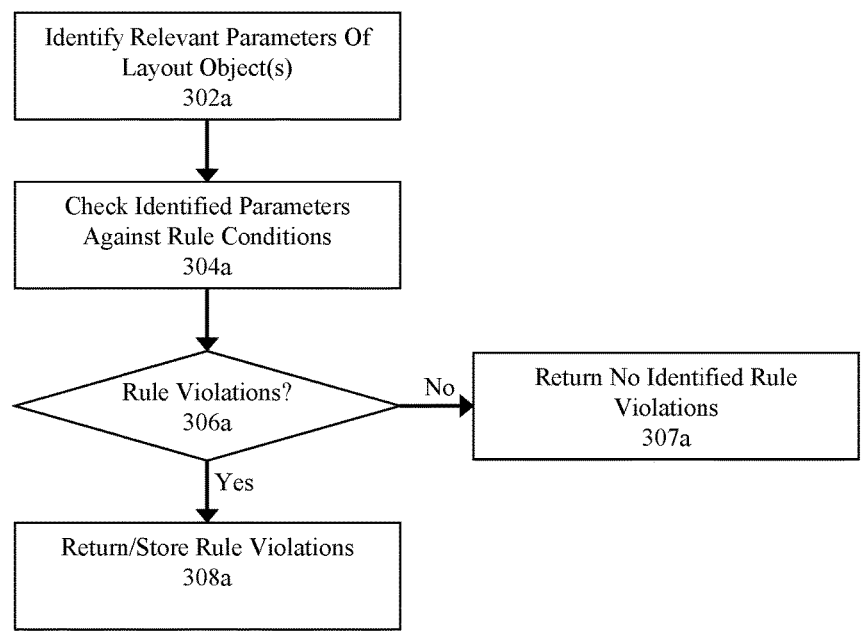
FIG. 3A illustrates a flow of an approach for displaying layout rule violations according to some embodiments of the invention.

FIG. 3A illustrates a flow of an approach for displaying layout rule violations according to some embodiments of the invention.

At 302a, the relevant parameters of the object for the new configuration are identified. For example, whether a default spacing is required or whether the object has a particular, or a minimum overlap in a certain area, or whether an object specific spacing is required with respect some other boundary or object. Or in other examples, the position and boundary of that particular object and any neighboring objects which may violate one or more rules.

At 304a, the identified parameters are checked against rule conditions that have been established for the particular layout in the layout canvas. For example, a rule may have been established that requires a limit on the size or area of an object.

A determination is made at 306a whether the configuration of the object causes a rule violation. If there is a rule violation, then at 308a a rule violation is stored and/or returned. If the configuration does not cause a rule violation, then no rule violation is stored and/or returned at 307a. Regardless of the conclusion the process may be repeated as necessary in order to process all relevant data regarding any potential violations.

Figure 3B:
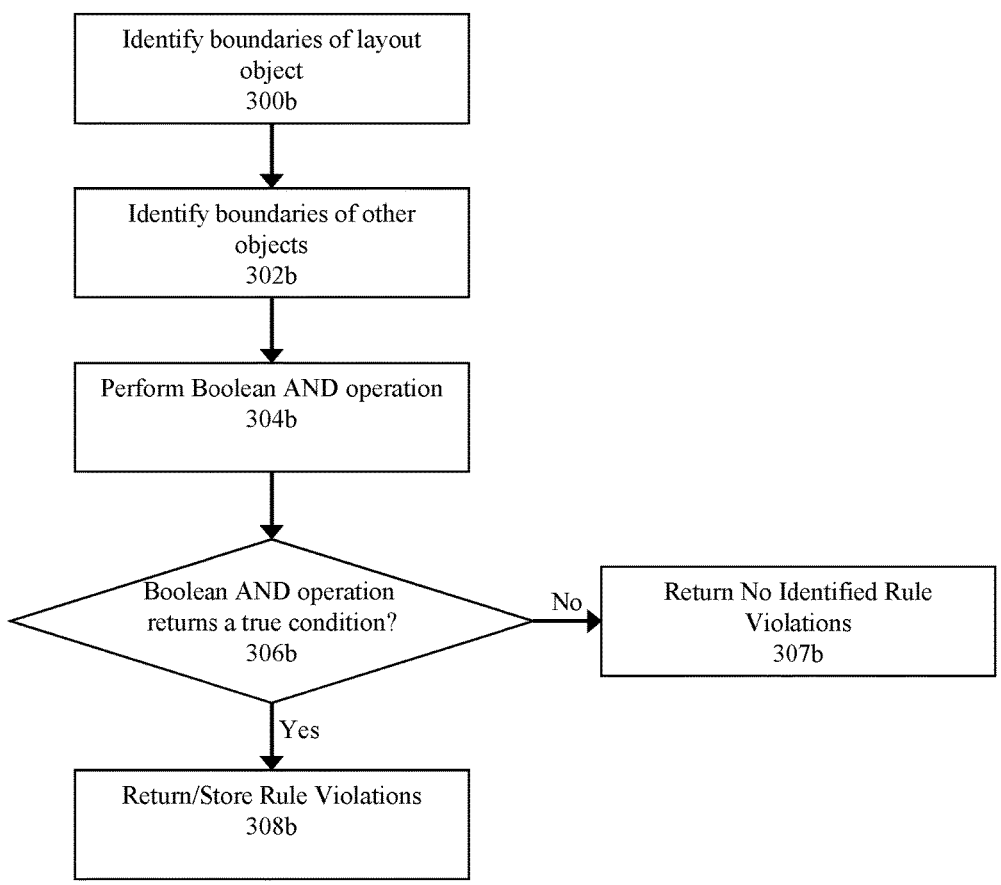
FIG. 3B illustrates a flow of an approach for checking for an overlap violation according to some embodiments of the invention.

FIG. 3B illustrates a flow of an approach for checking for an overlap violation according to some embodiments of the invention. An overlap rule establishes a condition in which it is deemed unacceptable if an object overlaps with another object.

At 300b, the process identifies the boundaries of the object, whether as a result of an initial violation determination or as a result of a user manipulation. The manipulation may have changed, for example, the location, size, shape, or dimensions of the object. These changes will cause the object to be associated with boundaries/edges that are different from its original boundaries/edges.

The boundaries, edges, and/or shapes of other objects are identified at 302b.

A Boolean AND operation is performed at 304b between the object that has been manipulated and the other objects of the layout. In some embodiments, such as when the verification is the result of a user manipulating the object, only objects in the direction of the manipulation may be verified.

If the Boolean AND operation presents a true condition at 306b, then this means that the object overlaps with another object. Therefore, a rules violation for the overlap will be identified at 308*b*. If, however, the Boolean AND operation returns a false condition, then an overlap does not exist between the object and other objects of the layout, at least with respect to those verified, and the process will return no overlap rules violations and/or return that no overlap rule has been violated at 307*b*.

Figure 4:
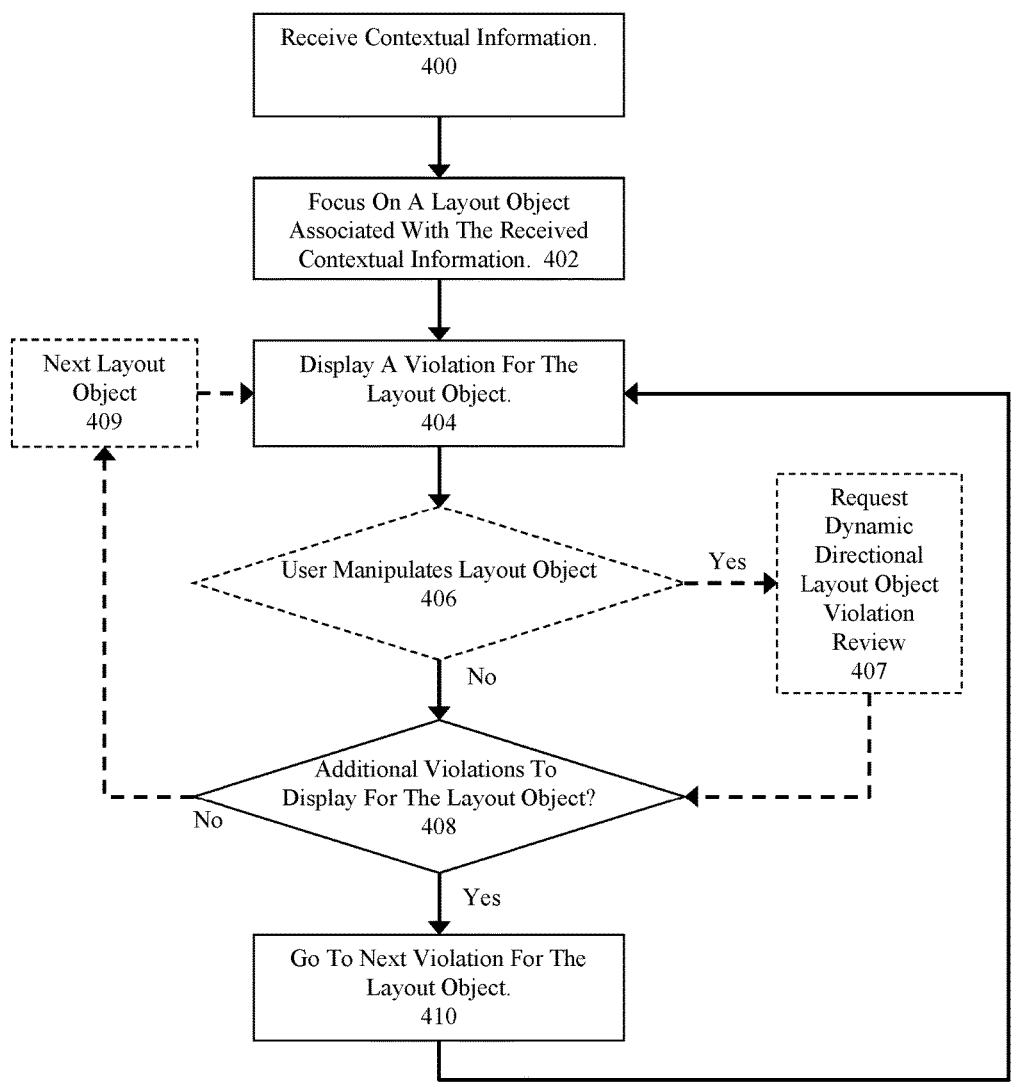
FIG. 4 illustrates a flow of an approach for performing serial review processes according to some embodiments of the invention.

FIG. 4 illustrates a flow of an approach for performing serial review processes according to some embodiments of the invention. Furthermore, the figure illustrates the possible interrelation between the serial review process and dynamic direction layout object violation review.

As was discussed, the process starts with the received contextual information such as at 400. Briefly this may include the present view, previous searches, selected or previously selected objects, menu selections, defaults, or any other relevant information with regard to identifying the context in which the serial review process has been initiated. Such information can then be used to provide a more natural transition between modes, such as by starting the serial review process with the most centrally located object in view of a display presented to a user or starting the process at the closest object to a representation of a pointing device on a display.

At 402 an identified object associated or most closely associated with the received contextual information may be focused on by moving the location of the portion of the layout displayed to the center of the screen or shifting the portion of the layout displayed, and/or zooming in or out such that at least the entire object is captured within a single view.

At 404 a violation for the layout object may be displayed. The selection of a violation to display may be performed in various manners, such as the top most violation may be displayed first, or differing types of violations may be displayed before others, or some other combination.

In some embodiments, the user may manipulate the object at 406 and trigger a request for dynamic directional object violation review at 407. Wherein as will be discussed, the violations display may be limited to those created by the movement, and after which the view and process will return to that of the serial review process.

Regardless, the process continues at 408, where a determination is made as to whether there are additional violations to be displayed for the currently layout object. If there are additional violations for the layout object, then at 410 the next violation is selected and the process returns to 404. Otherwise, the process may proceed to 409 where a next layout object may be identified for serial violation review.

Figure 5:
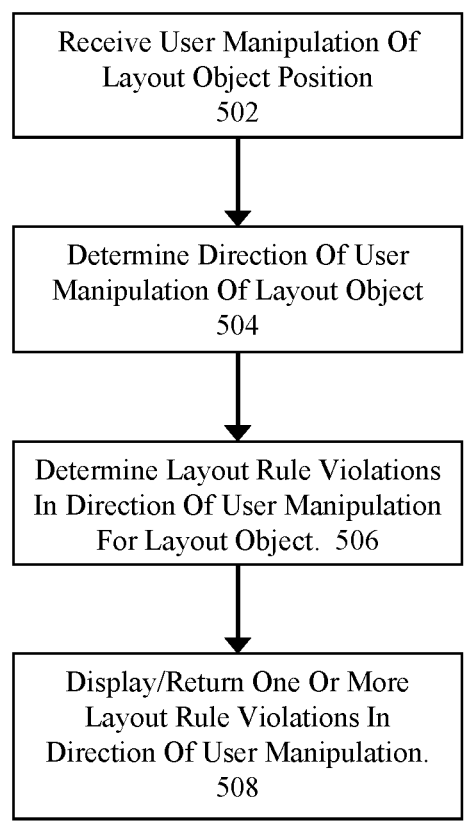
FIG. 5 illustrates a flow of an approach for performing directional layout object violation review according to some embodiments of the invention.

FIG. 5 illustrates a flow of an approach for performing directional layout object violation review according to some embodiments of the invention.

The process begins when a user manipulates the position of a layout object at 502. For instance, a user may use a pointing device to drag an object from one location towards another. In some embodiments, the object may be moved by first selecting the object, and then using one or more key strokes to move the object.

After the user moves the object from an original location to a new location, the direction of the manipulation may be determined by comparing the original location to the new location at 504. In one example, the user station could use the on canvas incremental rule violation identifier 108 to determine a vector representing the direction and magnitude of travel of the object.

Using the directional information, the on canvas incremental rule violation identifier 108 may determine at 506 whether the movement has created any new violation in the direction of the movement using the violation determination techniques discussed previously.

Finally, the incremental violation visualizer 109*b* may be used to display, store, and/or return any newly created violations at 508. For instance, the newly created violation could be stored with the previous violations and displayed to the user separately from other violations. In this way a user would receive prompt and timely feedback for any movement of objects of the layout.

ILLUSTRATIVE EXAMPLES

This document will now describe an illustrative example of the invention used in a computer aided design (CAD) system, such as an electronic design automation (EDA) system for implementing an electronic design. Such systems typically include a graphical user interface that allows a designer to manipulate electronic components and design elements for electronic designs.

Generally, to design an integrated circuit, an electronic designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes, cells, and/or components on the chip and includes information of circuit primitives such as transistors and diodes, their sizes and interconnections, for example. An integrated circuit designer may use a set of EDA application programs to create a design layout from a logical circuit design, where the layout includes geometric shapes to represent the various electrical components on an integrated circuit and to represent electronic and circuit IC components as geometric objects with varying shapes and sizes.

Eventually, the design of an integrated circuit or portions thereof are turned into layout objects in a CAD program where the logical representation of the objects corresponds to their eventual intended physical position with respect to the other objects within a layout.

FIGS. 6A-E provides an illustrative example of a serial review processes according to some embodiments of the invention.

Figure 6A:
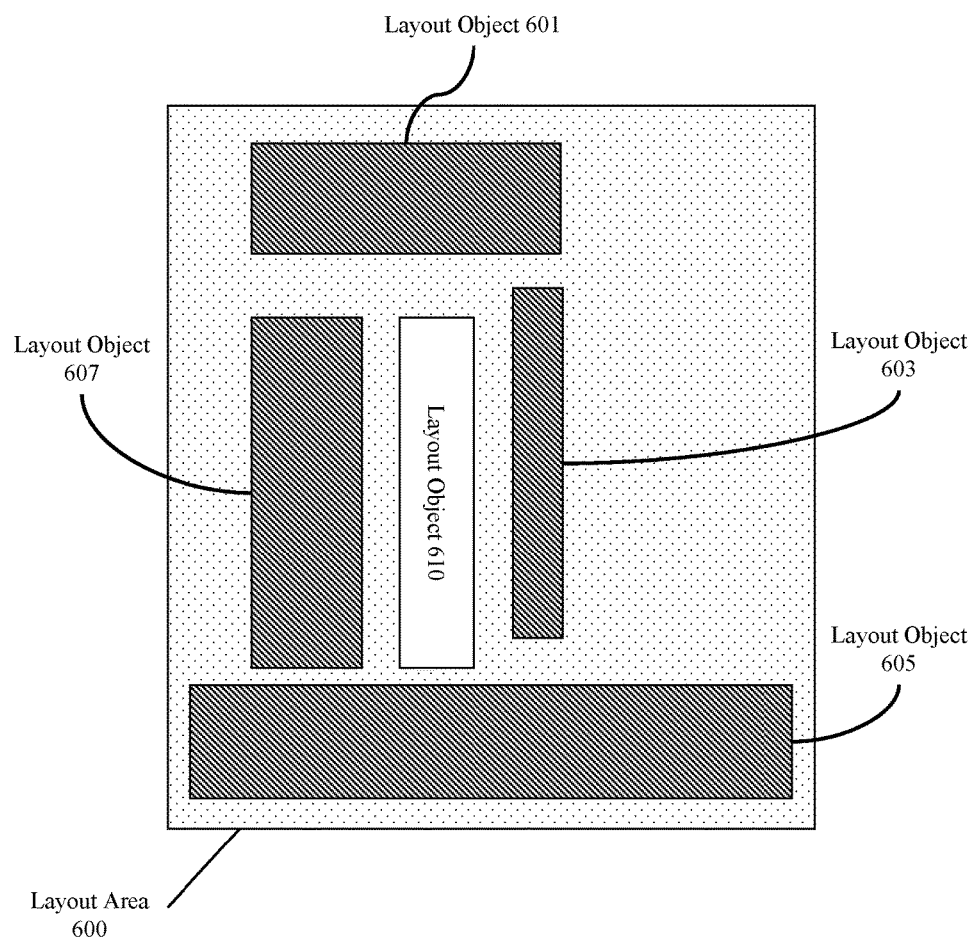
FIGS. 6A-E provides an illustrative example of a serial review processes according to some embodiments of the invention.

FIG. 6A provides an initial illustration of a simple layout without any violations displayed. This layout comprises various objects. A layout area 600 defining the legal area for positioning objects, and layout objects 601, 603, 605, 607, and 610 positioned relative to the layout area and the other respective layout objects. Such objects might represent anything from processors, to serial interface circuits, to memory arrays, or input/output buffers and ESD circuitry.

Figure 6B:
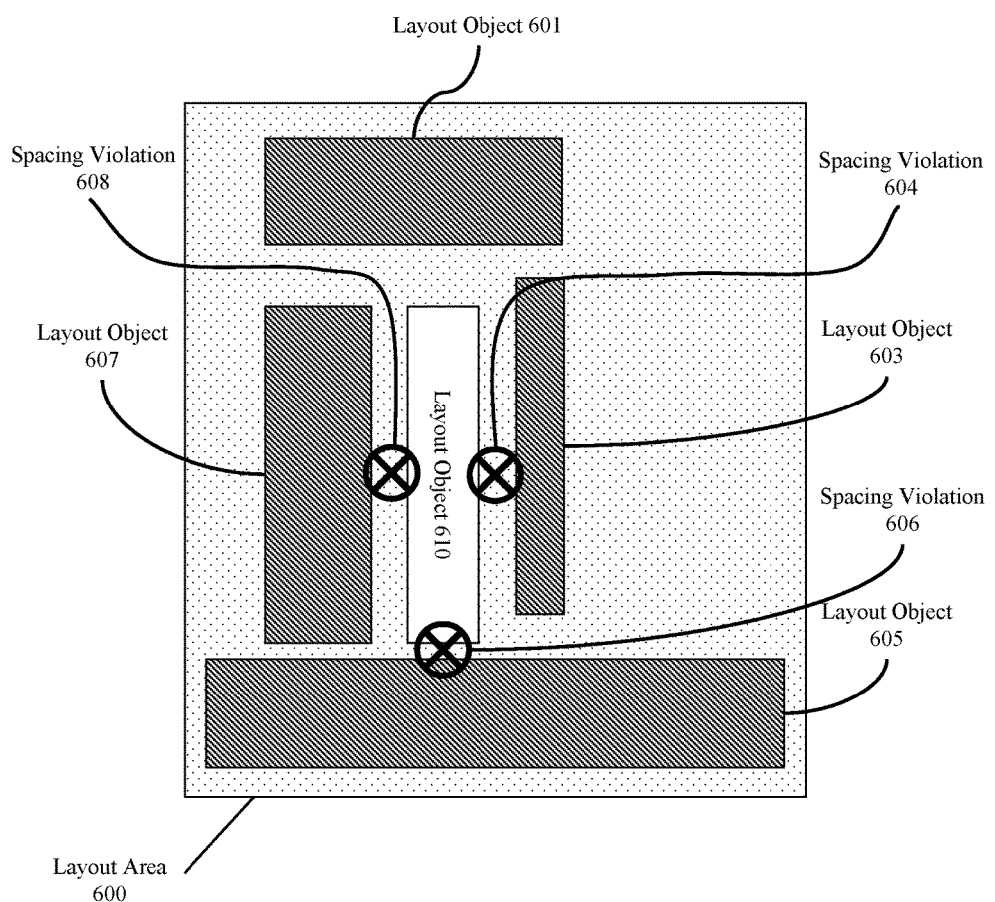

FIG. 6B adds an illustration of 3 spacing violations as determined by a layout verification process. While only three violations (spacing violations 604, 606, and 608) are shown here for simplicities sake, on many occasions such violations would be far more numerous and many would visually overlap with other violations.

Figure 6C:
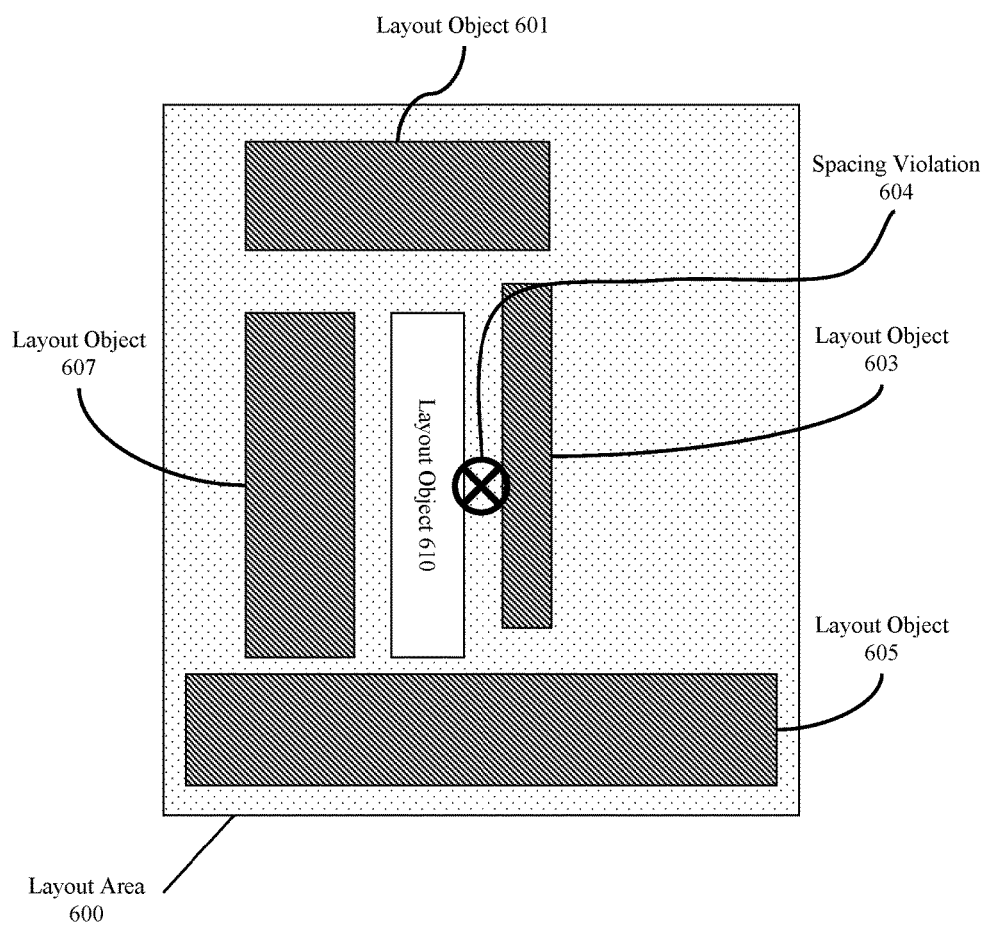

FIG. 6C illustrates the display after the serial violation review process is entered with respect to the layout object 610. Here, only one violation, spacing violation 604, of the three violations are display so that it may be individually reviewed.

Figure 6D:
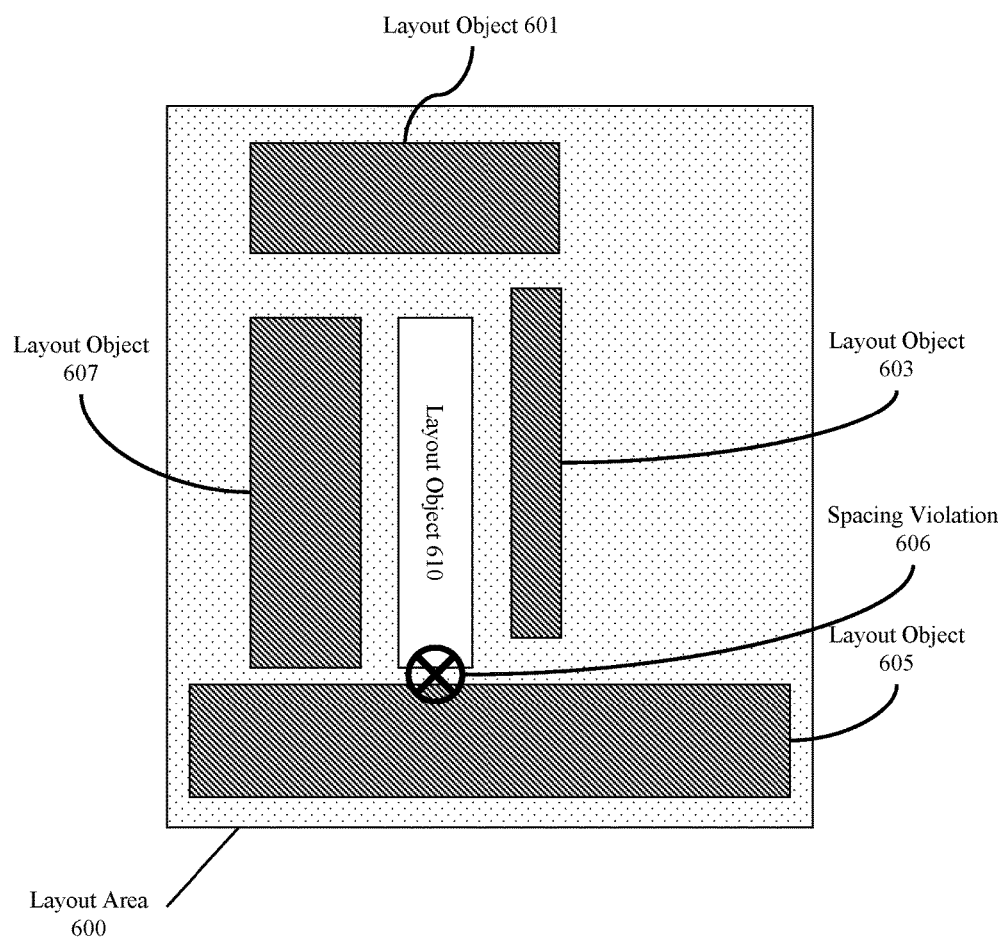
Figure 6E:
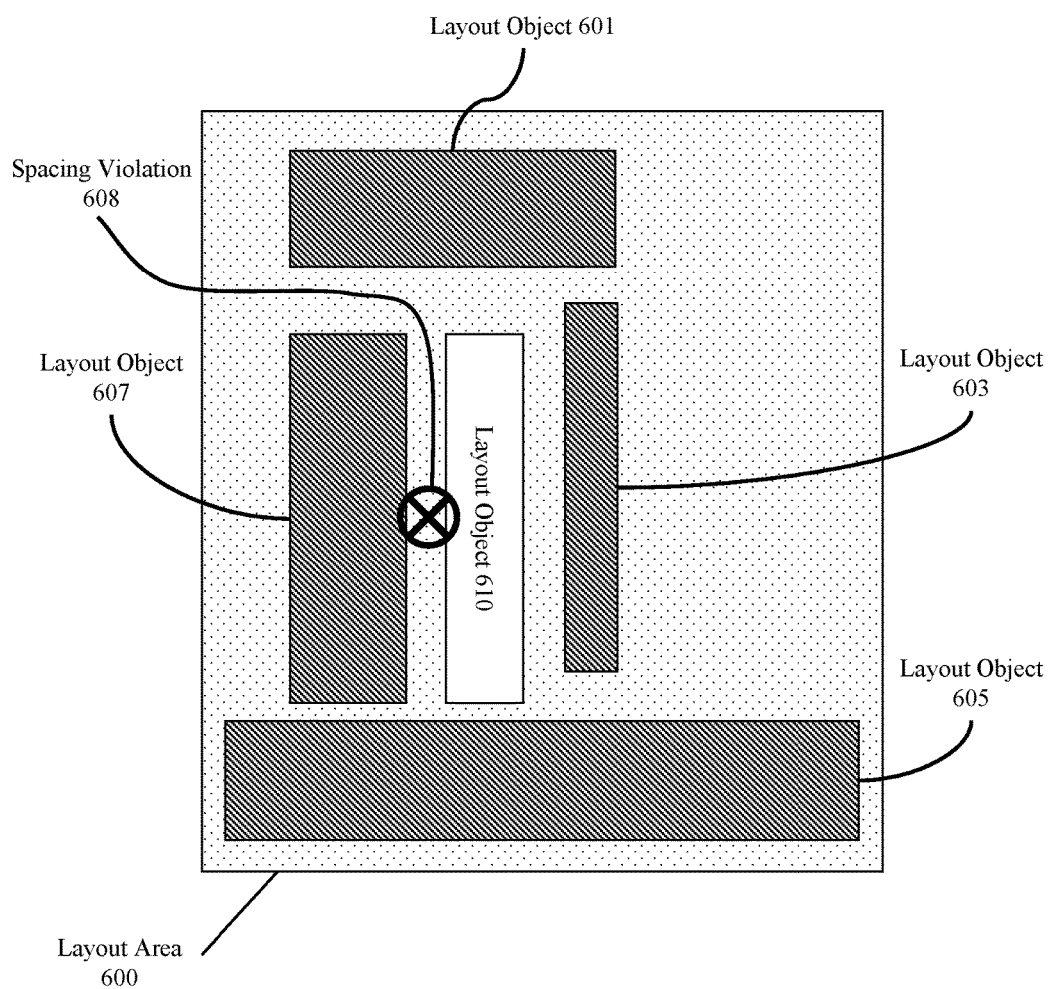

FIGS. 6D and 6E illustrate the display of spacing violations 606 and 608 respectively. As would be understood, the benefits of this method only increase with the increasing complexity of modern technology processes.

FIGS. 7A-G provide an illustrative example of directional layout object violation review according to some embodiments of the invention.

Figure 7A:
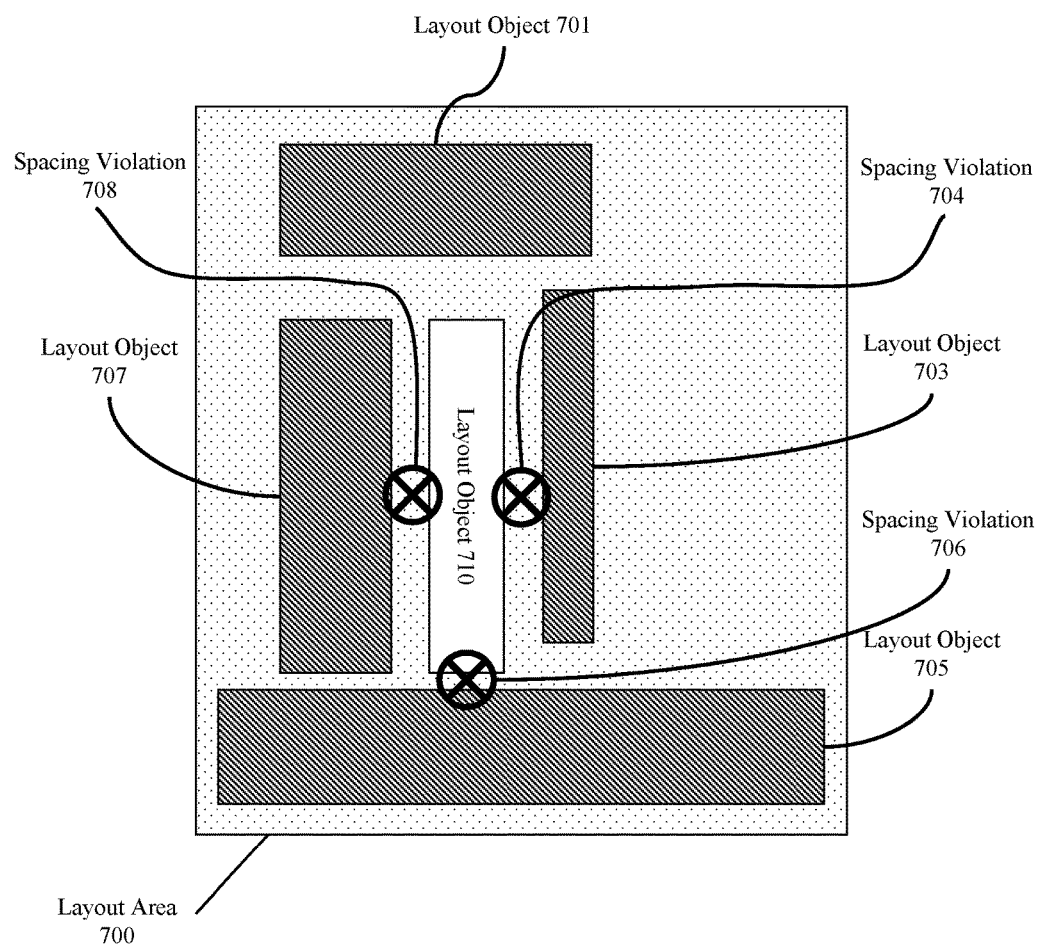
FIGS. 7A-G provides an illustrative example of directional layout object violation review according to some embodiments of the invention.

FIG. 7A provides an initial illustration of a simple layout with 3 spacing violations displayed as determined by a layout verification process. This layout is essentially equivalent to that of FIG. 6B, and includes various objects such as layout area 700 defining the legal area for positioning objects, and layout objects 701, 703, 705, 707, and 710 positioned relative to the layout area and the other respective layout objects, and illustrates 3 spacing violations (spacing violations 704, 706, and 708) as determined by a layout verification process.

Figure 7B:
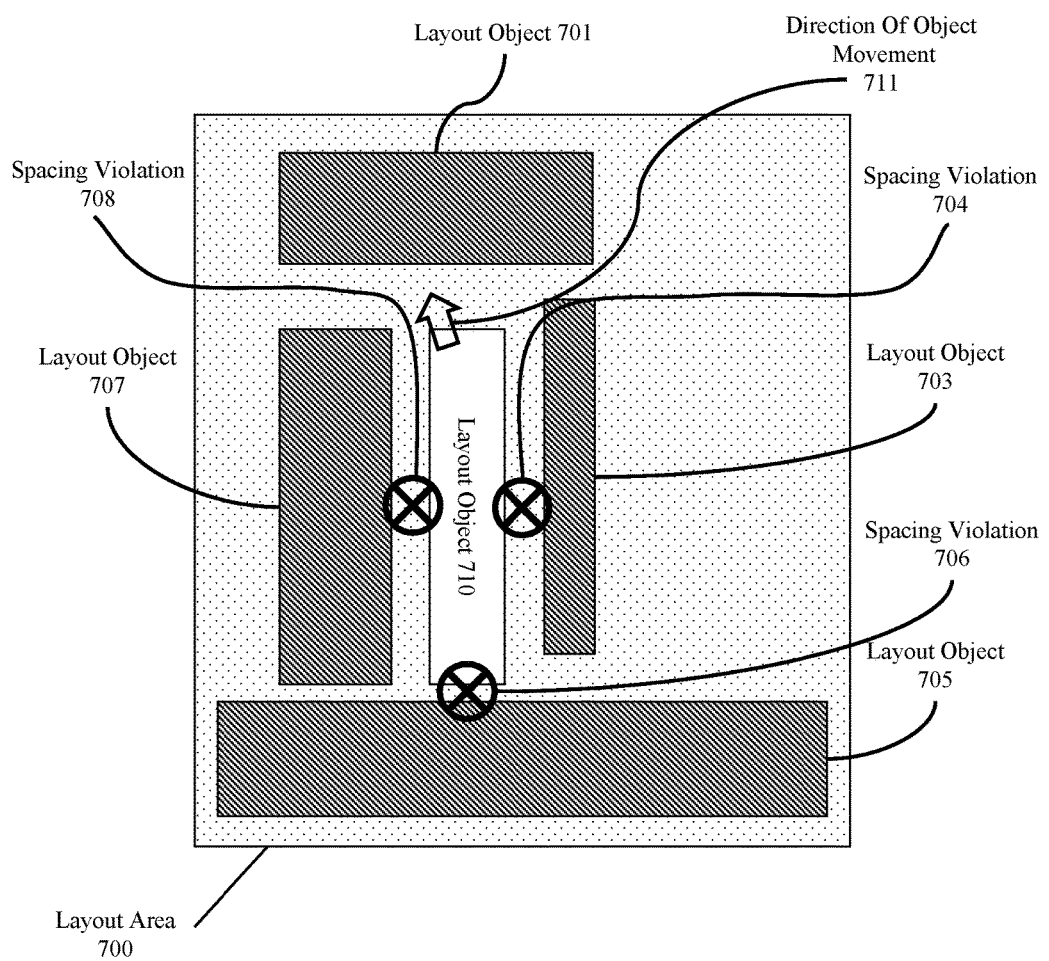
Figure 7C:
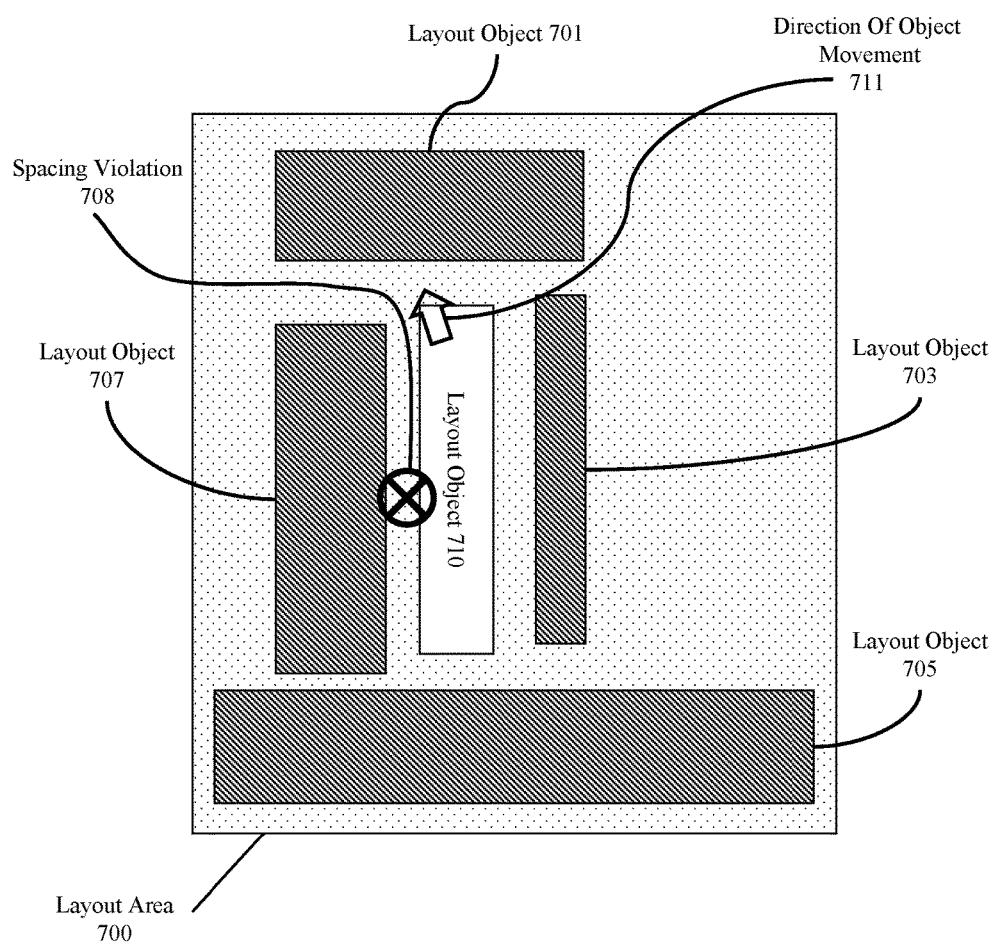

FIGS. 7B and 7C illustrate the movement of layout object 710 as indicated by the direction of movement 711 and the associated arrows indication thereof. Furthermore FIG. 7C illustrates the change in the display with regard to the display of the violations. Specifically, once the layout object 710 is moved, the violations that are not in the direction of the movement are no longer displayed (See FIG. 7B illustrating spacing violations 704 and 706 and FIG. 7C that does not include these violations because they are not in the direction of movement).

Figure 7D:
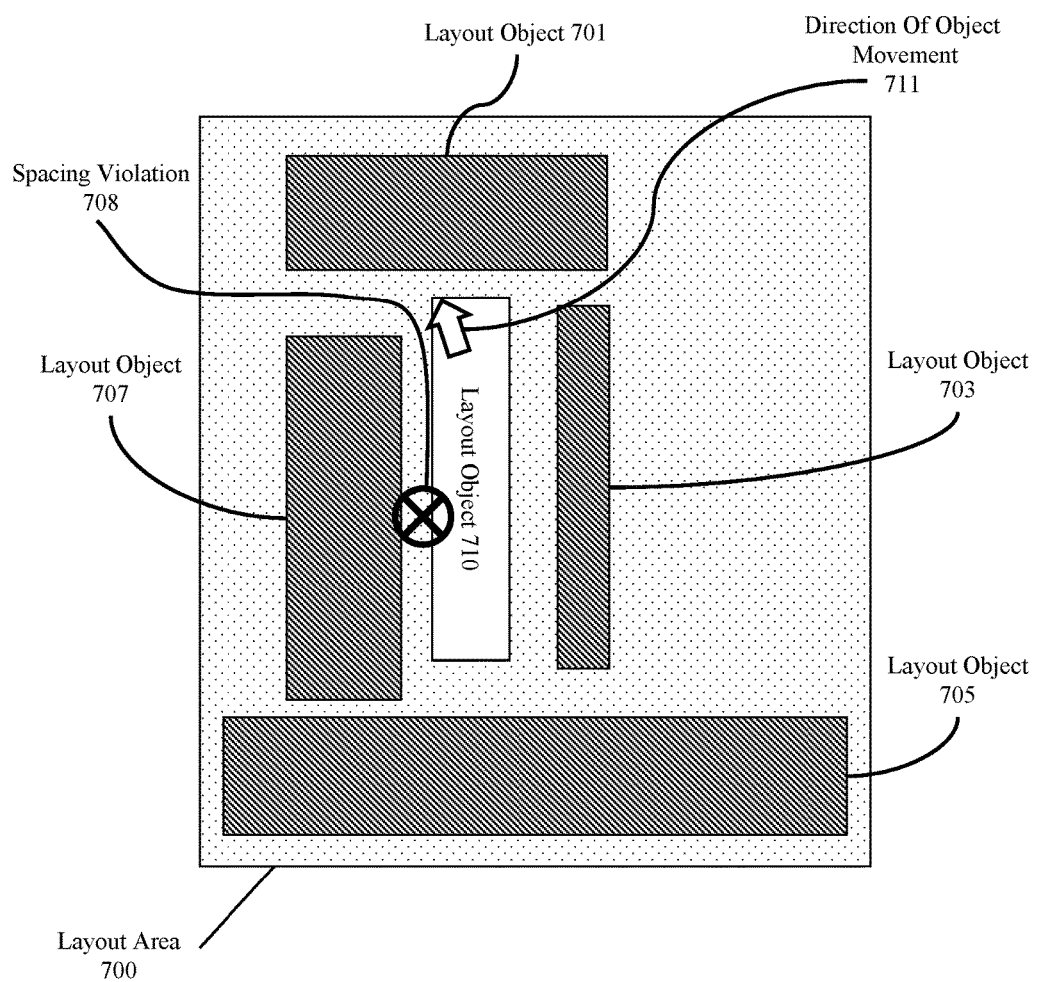

FIG. 7D illustrates the movement of layout object 710 to a new position. However, as a result of the movement an additional violation is identified. That violation is then illustrated as spacing violation 702 in FIG. 7E.

Figure 7E:
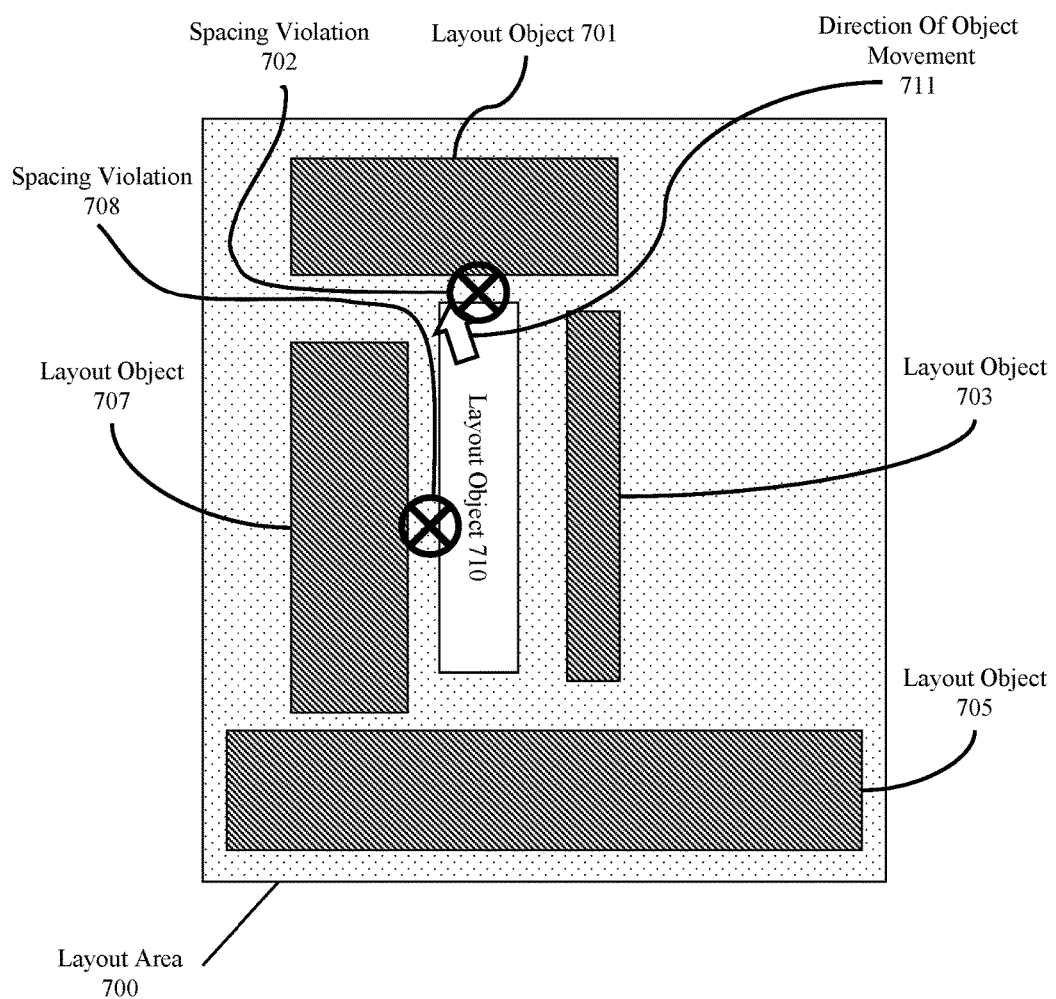
Figure 7F:
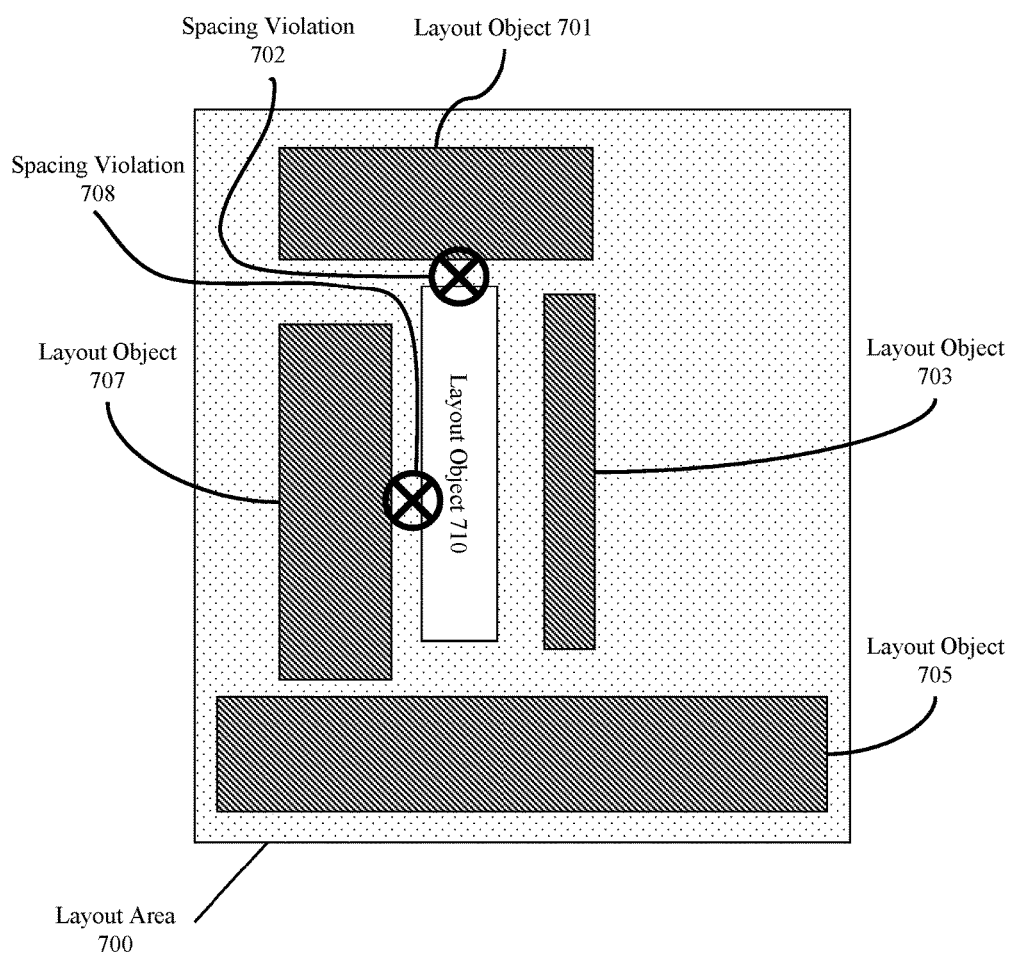
Figure 7G:
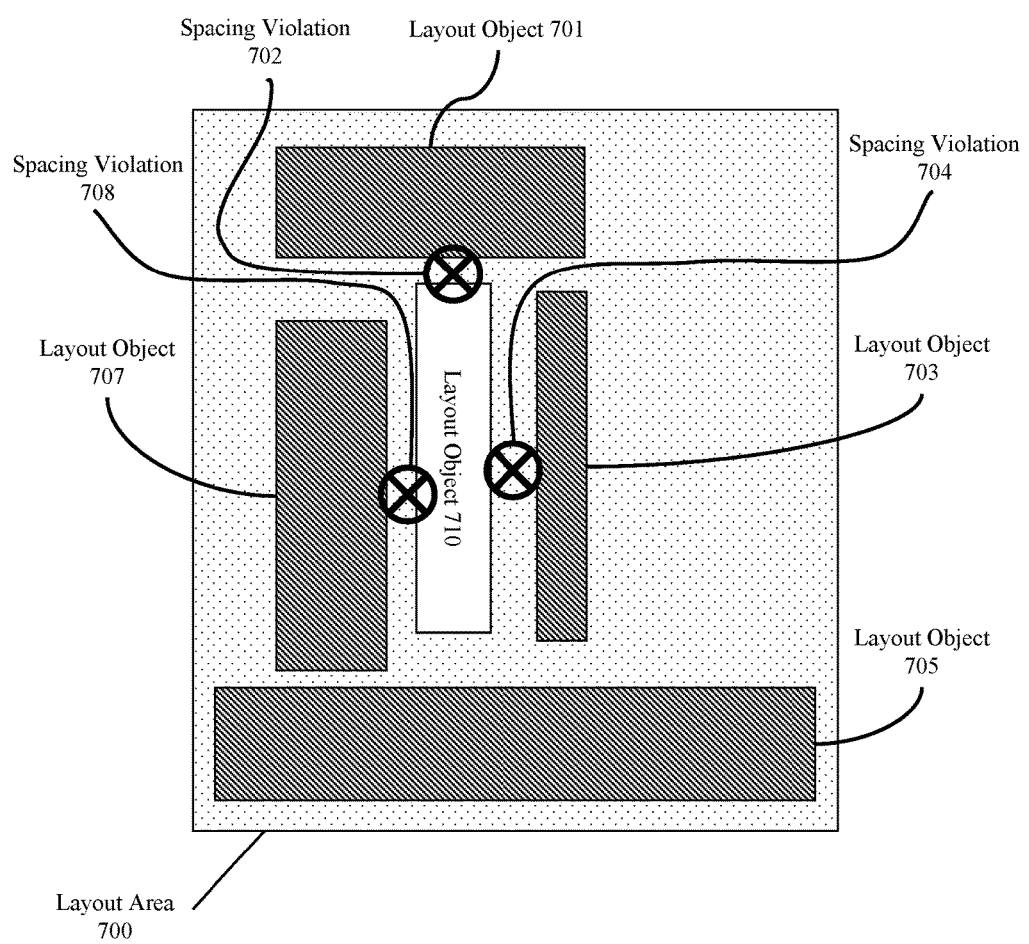

Finally, at FIG. 7E the layout object is placed in the new position with spacing violations 702 and 708 display because they are in the direction of the movement. At which time, if the user wishes to leave the object in that particular location the user may return the previous display mode as illustrated in FIG. 7G which includes previously provided spacing violation 704, but does not include the former violation between layout object 710 and 705 (spacing violation 706), because the spacing requirement is no longer violated.

In some embodiments, other violations may be displayed during object movement. However, in order to preserve the benefit of the inventive aspects herein, the previously existing violations may be displayed in a transparent or other reduced emphasis manner, such that preexisting violations are easily discernable from newly created violations. Furthermore, in some embodiments only the new violations may be shown in order to simplify communication of the information. Additionally, in some embodiments the particular behavior may be controlled based on one or more user, user station, or layout settings.

Figure 8A:
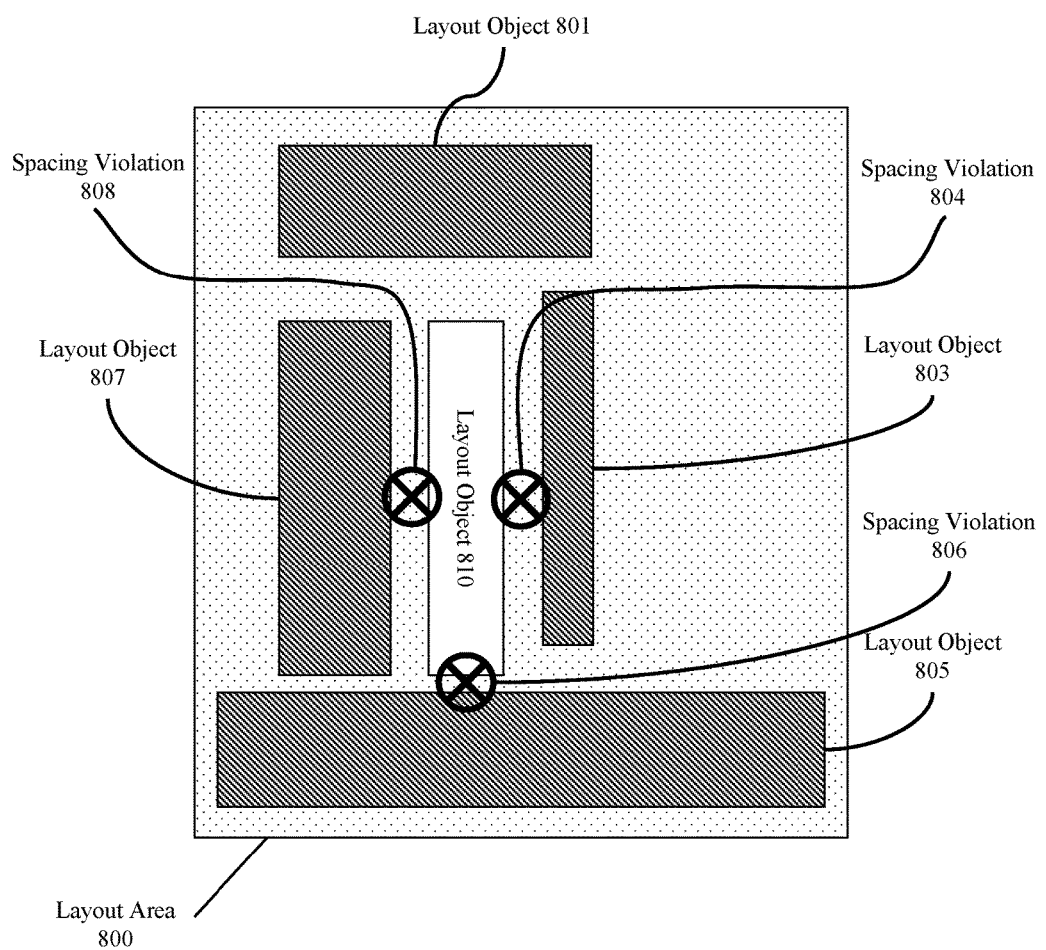
FIGS. 8A-B provide an illustrative example of some user interface aspects.
Figure 8B:
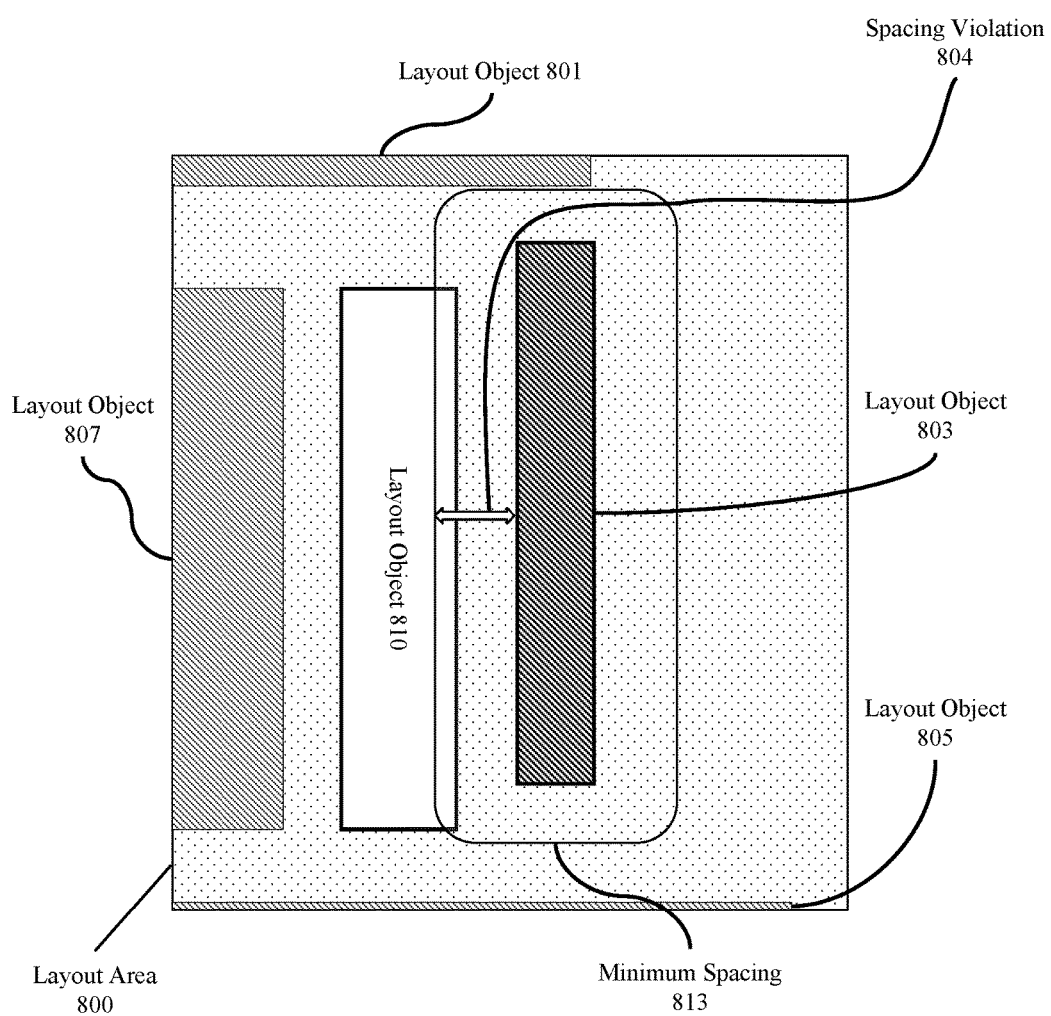

FIGS. 8A-B provide an illustrative example of some user interface aspects.

FIG. 8A provides an initial illustration of a simple layout with 3 spacing violations displayed as determined by a layout verification process. This layout is essentially equivalent to that of FIG. 6B, and includes various objects such as layout area 800 defining the legal area for positioning objects, and layout objects 801, 803, 805, 807, and 810 positioned relative to the layout area and the other respective layout objects, and illustrates 3 spacing violations (spacing violations 804, 806, and 808) as determined by a layout verification process.

FIG. 8B illustrates a second view of the example user interface after the user has entered serial rule violation mode. This includes adjusting the focus of the view, dimming objects not associated with a displayed violation and highlighting the associated objects, and a graphical representation of the displayed violation.

In a first aspect, the view can be adjusted to focus the display on a currently violation. For instance, spacing violation 804 illustrated in the example. In this way, when the users view is not focused in and/or on the correct area the displayed portion may be adjusted to focus on the violation. Focusing may include, zooming the view in or out to appropriately size the view, moving the portion associated with the display window to include the objects associated with the violation (here the selected layout object 810 and layout object 803), or a combination of the two. Furthermore, in some embodiments the view may be adjusted based on one or more user preferences, or based on one or more thresholds or conditions. For instance, the view may not be adjusted when the selected object is already completely displayed in the view, when the selected object and another object(s) associated with the violation are on the screen, or when the selected object and the associated objects occupy 25-75% of the displayed view. In some embodiments, the view may always be adjusted to insure that the selected object, any rule violation graphics, and any associated object(s) are displayed. In some embodiments, it may be impractical to display both the selected object and any associated object(s) in their entirety. As such, when the objects are sized such they cannot be displayed in their entirety along with a meaningful representation of the displayed violation, a portion of the selected object and the one or more associated object(s) may be displayed in conjunction with the displayed violation.

In a second aspect, the selected object, and the one more associated object(s) may be highlight is some fashion. For instance, objects 803 and 810 may be highlight through any known manner, such as by increasing the brightness, intensity, or saturation of the object, or as illustrated, by increasing the thickness of the border of the object (see FIGS. 8A-B). Furthermore, in other aspects, the objects visible in the view that are not associated with the violation may be de-emphasized. For example, de-emphasis may be accomplished by decreasing the brightness, intensity, or saturation of the unassociated object(s), or by decreasing the thickness of the border of the object. By way of example, FIG. 8B illustrates de-emphasis of objects 801, 805, and 807 by decreasing the saturation of the objects and by decreasing the thickness of the borders. Furthermore, color may also be used to emphasize different information. For instance, object(s) associated with a violation may also be associated with a glow, such as a red hue surrounding the object(s). Furthermore, objects that are not associated with a violation may also be associated with a glow, e.g. a green hue surround the object. Finally, the borders and internal colors may be changed or modified using colors to indicate information, such as dimming and adding a green hue to objects not associated with the displayed violation, and adding a red hue to objects associated with the violation. In this way, additional visual cues may be used to represent information associated with one or more objects.

In a third aspect, a halo or outline may be added to the one or more objects to indicate a required spacing. For example, FIG. 8B includes a minimum spacing outline 813 around layout object 803. This minimum spacing outline 813 may correspond to the minimum spacing required for object 803, of which violation thereof may result in a spacing violation such as spacing violation 804. Specifically, layout object 810 is located too close to layout object 803 such that layout object 810 is encroaching on the required buffer space for layout object 803 and has therefore caused a spacing violation 804 to be generated. In this way, the display includes not only an indication of the objects involved in the violation, but also an indication of the minimum distance that the object should be placed away from another object(s).

System Architecture Overview

Figure 9:
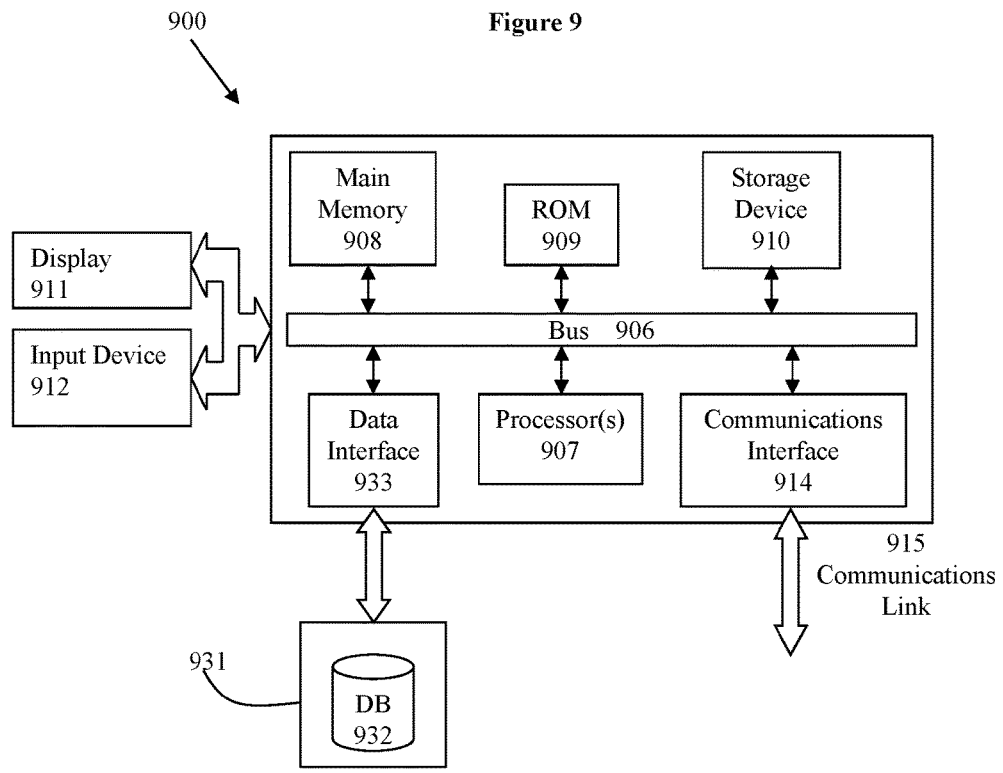
FIG. 9 shows an architecture of an example computing system with which the invention may be implemented.

FIG. 9 is a block diagram of an illustrative computing system 900 suitable for implementing an embodiment of the present invention. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control.

According to one embodiment of the invention, computer system 900 performs specific operations by processor 907 executing one or more sequences of one or more instructions contained in system memory 908. Such instructions may be read into system memory 908 from another computer readable/usable medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution. Computer system 900 may communicate through a data interface 933 to a database 932 on an external storage device 931.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing a graphical user interface of an electronic design automation system on a display device, comprising:
    displaying at least a portion of an electronic design in a graphical user interface having at least a first mode and a second mode of an electronic design automation system on a display of a display device, the second mode comprising a review mode implemented by at least a serializer component;
    determining a plurality of rule violations by the electronic design;
    displaying a portion of the electronic design and at least two of the plurality of rule violations on the graphical user interface in a first mode, wherein the first mode comprises displaying a subset of the plurality of rule violations, the subset corresponding to the portion of the electronic design and to two or more rule violations of the plurality of rule violations; and
    receiving a command to enter a review mode for separately reviewing one or more rule violations of the plurality of rule violations of the electronic design on a layout object by layout object basis, and implementing the review mode using the serializer component of the graphical user interface that displays rule violations, wherein the serializer component provides for serially reviewing rule violations associated with an identified individual layout object of a plurality of layout objects, by:
        identifying a layout object of the electronic design to be displayed with respective rule violations of the one or more rule violations as part of the review mode, the layout object being associated with multiple rule violations of the one or more rule violations,
        displaying the layout object of the electronic design and a first rule violation of the one or more rule violations on the display, the first rule violation being associated with the layout object of the electronic design, and
        displaying a second rule violation on the display after displaying the first rule violation on the display without displaying the first rule violation at the same time as the second rule violation, the second rule violation being associated with the layout object of the electronic design.

2. The method of claim 1, wherein identifying a layout object further comprises:
    receiving contextual information; and
    determining based on the contextual information which layout object to identify for display of rule violations as part of the review mode.

3. The method of claim 1, wherein displaying a rule violation further comprises:
    focusing the display on the layout object, and wherein focusing comprises confirming that at least a portion of the layout object is displayed or adjusting the display to display a portion of a layout that includes at least a portion of the layout object.

4. The method of claim 1, wherein when the layout object is not associated with a third rule violation, displaying a fourth rule violation associated with a second layout object.

5. The method of claim 1, further comprising requesting directional layout rule violation review.

6. The method of claim 5, wherein directional layout rule violation review comprises:

receiving data corresponding to a user manipulation of the layout object;

determining a direction of the user manipulation of the layout object;

identifying at least one rule violation in the direction of the user manipulation; and displaying the at least one rule violation in the direction of the user manipulation.

7. The method of claim 6, wherein determining the direction of the user manipulation of the layout object comprises calculating a vector representing a difference in position of the layout object before the user manipulation and after the user manipulation.

8. A computer program product that includes a non-transitory computer readable medium, the computer readable medium comprising a plurality of computer instructions which, when executed by a processor, cause the processor to execute a process for implementing a graphical user interface of an electronic design automation system on a display device, the process comprising:

displaying at least a portion of an electronic design in a graphical user interface having at least a first mode and a second mode of an electronic design automation system on a display of a display device, the second mode comprising a review mode implemented by at least a serializer component;

determining a plurality of rule violations by the electronic design;

displaying a portion of the electronic design and at least two of the plurality of rule violations on the graphical user interface in a first mode, wherein the first mode comprises displaying a subset of the plurality of rule violations, the subset corresponding to the portion of the electronic design and to two or more rule violations of the plurality of rule violations; and receiving a command to enter a review mode for separately reviewing one or more rule violations of the plurality of rule violations of the electronic design on a layout object by layout object basis, and implementing the review mode using the serializer component of the graphical user interface that displays rule violations, wherein the serializer component provides for serially reviewing rule violations associated with an identified individual layout object of a plurality of layout objects, by:

identifying a layout object of the electronic design to be displayed with respective rule violations of the one or more rule violations as part of the review mode, the layout object being associated with multiple rule violations of the one or more rule violations, displaying the layout object of the electronic design and a first rule violation of the one or more rule violations on the display, the first rule violation being associated with the layout object of the electronic design, and displaying a second rule violation on the display after displaying the first rule violation on the display without displaying the first rule violation at the same time as the second rule violation, the second rule violation being associated with the layout object of the electronic design.

9. The computer program product of claim 8, wherein identifying a layout object further comprises:

receiving contextual information; and determining based on the contextual information which layout object to identify for display of rule violations as part of the review mode.

10. The computer program product of claim 8, wherein displaying a rule violation further comprises:

focusing the display on the layout object, and wherein focusing comprises confirming that at least a portion of the layout object is displayed or adjusting the display to display a portion of a layout that includes at least a portion of the layout object.

11. The computer program product of claim 8, wherein when the layout object is not associated with a third rule violation, displaying a fourth rule violation associated with a second layout object.

12. The computer program product of claim 8, further comprising requesting directional layout rule violation review.

13. The computer program product of claim 12, wherein directional layout rule violation review comprises:

receiving data corresponding to a user manipulation of the layout object;

determining a direction of the user manipulation of the layout object;

identifying at least one rule violation in the direction of the user manipulation; and displaying the at least one rule violation in the direction of the user manipulation.

14. The computer program product of claim 13, wherein determining the direction of the user manipulation of the layout object comprises calculating a vector representing a difference in position of the layout object before the user manipulation and after the user manipulation.

15. A system for implementing a graphical user interface of an electronic design automation system on a display device, comprising:

a display device capable of displaying a graphical user interface;

a pointer device controllable by a user for manipulating an object in the graphical user interface; and a computing system to control images displayed on a display of the display device, where the computing system receives instructions corresponding to:

displaying at least a portion of an electronic design in the graphical user interface having at least a first mode and a second mode of an electronic design automation system on the display of the display device, the second mode comprising a review mode implemented by at least a serializer component;

determining a plurality of rule violations by the electronic design;

displaying a portion of the electronic design and at least two of the plurality of rule violations on the graphical user interface in a first mode, wherein the first mode comprises displaying a subset of the plurality of rule violations, the subset corresponding to the portion of the electronic design and to two or more rule violations of the plurality of rule violations; and receiving a command to enter a review mode for separately reviewing one or more rule violations of the plurality of rule violations of the electronic design on a layout object by layout object basis, and implementing the review mode using the serializer component of the graphical user interface that displays rule violations, wherein the serializer component provides for serially reviewing rule violations associated with an identified individual layout object of a plurality of layout objects, by:
- identifying a layout object of the electronic design to be displayed with respective rule violations of the one or more rule violations as part of the review mode, the layout object being associated with multiple rule violations of the one or more rule violations,
- displaying the layout object of the electronic design and a first rule violation of the one or more rule violations on the display, the first rule violation being associated with the layout object of the electronic design, and
- displaying a second rule violation on the display after displaying the first rule violation on the display without displaying the first rule violation at the same time as the second rule violation, the second rule violation being associated with the layout object of the electronic design.

16. The system of claim 15, wherein identifying a layout object further comprises:
- receiving contextual information; and
- determining based on the contextual information which layout object to identify for display of rule violations as part of the review mode.

17. The system of claim 15, wherein displaying a rule violation further comprises:
- focusing the display on the layout object, wherein focusing comprises confirming that at least a portion of the layout object is displayed or adjusting the display to display a portion of a layout that includes at least a portion of the layout object.

18. The system of claim 15, wherein when the layout object is not associated with a third rule violation, displaying a fourth rule violation associated with a second layout object.

19. The system of claim 15, further comprising requesting directional layout rule violation review.

20. The system of claim 19, wherein directional layout rule violation review comprises:
- receiving data corresponding to a user manipulation of the layout object;
- determining a direction of the user manipulation of the layout object;
- identifying at least one rule violation in the direction of the user manipulation; and
- displaying the at least one rule violation in the direction of the user manipulation.

* * * * *